(12) United States Patent
Hoshiba

(10) Patent No.: US 11,077,724 B2
(45) Date of Patent: *Aug. 3, 2021

(54) PNEUMATIC TIRE

(71) Applicant: The Yokohama Rubber Co., LTD., Tokyo (JP)

(72) Inventor: Takashi Hoshiba, Hiratsuka (JP)

(73) Assignee: The Yokohama Rubber Co., LTD., Tokyo (JP)

( * ) Notice: Subject to any disclaimer, the term of this patent is extended or adjusted under 35 U.S.C. 154(b) by 258 days.

This patent is subject to a terminal disclaimer.

(21) Appl. No.: 15/773,778

(22) PCT Filed: Oct. 24, 2016

(86) PCT No.: PCT/JP2016/081450
§ 371 (c)(1),
(2) Date: May 4, 2018

(87) PCT Pub. No.: WO2017/077893
PCT Pub. Date: May 11, 2017

(65) Prior Publication Data
US 2018/0319224 A1 Nov. 8, 2018

(30) Foreign Application Priority Data
Nov. 6, 2015 (JP) .............................. JP2015-218256

(51) Int. Cl.
*B60C 19/00* (2006.01)
*B60C 5/00* (2006.01)
*B29D 30/06* (2006.01)

(52) U.S. Cl.
CPC ............ *B60C 19/002* (2013.01); *B60C 5/002* (2013.01); *B29D 30/0681* (2013.01)

(58) Field of Classification Search
CPC .................................................. B60C 19/002
See application file for complete search history.

(56) References Cited

U.S. PATENT DOCUMENTS

2006/0231185 A1 10/2006 Tanno
2007/0017619 A1 1/2007 Yukawa
(Continued)

FOREIGN PATENT DOCUMENTS

CN 1899862 1/2007
JP 2006-182280 7/2006
(Continued)

OTHER PUBLICATIONS

Machine Translation: JP-2009023548-A; Ishihara, Taiga; (Year: 2020).*

(Continued)

*Primary Examiner* — Kendra Ly
(74) *Attorney, Agent, or Firm* — Thorpe North & Western

(57) ABSTRACT

A pneumatic tire includes: an annular-shaped tread portion extending in a tire circumferential direction; a pair of sidewall portions disposed on both sides of the tread portion; and a pair of bead portions disposed on an inner side in a tire radial direction of the sidewall portions; and a band-like sound absorbing member being adhered on an inner surface of the tread portion in the tire circumferential direction; wherein the band-like sound absorbing member has a plurality of cuts, and both terminals of the cuts terminate at an inner side of the band-like sound absorbing member.

12 Claims, 5 Drawing Sheets

(56) References Cited

U.S. PATENT DOCUMENTS

| | | | |
|---|---|---|---|
| 2007/0146124 A1 | 6/2007 | Shinmura | |
| 2009/0277549 A1 | 11/2009 | Tanno | |
| 2015/0306922 A1* | 10/2015 | Kim | B60C 19/002 |
| | | | 152/157 |
| 2016/0288588 A1 | 10/2016 | Tanno | |
| 2016/0339749 A1* | 11/2016 | Yukawa | B60C 19/002 |

FOREIGN PATENT DOCUMENTS

| | | | | |
|---|---|---|---|---|
| JP | 2006341629 A | * | 12/2006 | B60C 19/002 |
| JP | 2008080969 A | * | 4/2008 | |
| JP | 2008-174080 | | 7/2008 | |
| JP | 2008254339 A | * | 10/2008 | |
| JP | 2009-023548 | | 2/2009 | |
| JP | 2009023548 A | * | 2/2009 | |
| JP | 4281874 | | 6/2009 | |
| JP | 5267288 | | 8/2013 | |
| JP | 2015-147544 | | 8/2015 | |
| WO | WO 2005/012007 | | 2/2005 | |
| WO | WO 2015/076380 | | 5/2015 | |
| WO | WO 2015/118707 | | 8/2015 | |

OTHER PUBLICATIONS

Machine Translation: JP-2008080969-A; Ishihara, Taiga; (Year: 2020).*

Machine Translation: JP-2008254339-A, Kanzawa, Satoshi, (Year: 2020).*

Machine Translation: JP-2006341629-A, Kamiyama, Yoichi, (Year: 2020).*

International Search Report for International Application No. PCT/JP2016/081450 dated Jan. 24, 2017, 4 pages, Japan.

\* cited by examiner

PNEUMATIC TIRE

TECHNICAL FIELD

The present technology relates to a pneumatic tire, and particularly relates to a pneumatic tire that can promote heat dissipation from a band-like sound absorbing member, and improve high-speed durability, in conjunction with relieving stress occurring on the band-like sound absorbing member during a tire rolling motion, and improving the durability of the band-like sound absorbing member, by providing a cut on the band-like sound absorbing member adhered to an inner surface of the tire.

BACKGROUND ART

Cavernous resonance caused by the vibration of the air filled in a cavity portion of a tire is one cause of tire noise. Cavernous resonance is caused by a tread portion of a tire contacting a road surface during vehicle travel vibrating due to unevenness on the road surface, and the vibration is caused by air inside a cavity portion of a tire vibrating. The cavernous resonance has a frequency range where noise is generated, and reducing the noise level of the frequency range is important in order to reduce tire noise.

Attaching a sound absorbing member including a porous material such as a sponge or the like to an inner circumferential surface of a tread portion on a tire inner surface by an elastic fixed band has been proposed as a method of reducing noise due to the cavernous resonance phenomenon (for example, refer to Japan Patent No. 4281874). However, if securing the sound absorbing member is dependent on the elastic fixed band, problems occur where the elastic fixed band deforms during high speed travel.

In contrast thereto, a method of directly adhering and securing a band-like sound absorbing member to a tire inner surface has been proposed (for example, refer to Japan Patent No. 5267288). However, in this case, the band-like sound absorbing member is directly applied to a tire inner surface, and therefore, problems occur where heat accumulation is generated on a tread portion, and high-speed durability deteriorates due to heat accumulation. Furthermore, if the band-like sound absorbing member is directly applied on a tire inner surface, problems occur where the band-like sound absorbing member cannot follow tire deflection during a tire rolling motion and therefore is damaged.

SUMMARY

The present technology provides a pneumatic tire that can promote heat dissipation from a band-like sound absorbing member, and improve high-speed durability, in conjunction with relieving stress occurring on the band-like sound absorbing member during a tire rolling motion, and improving the durability of the band-like sound absorbing member, by providing a cut on the band-like sound absorbing member adhered to an inner surface of the tire.

A pneumatic tire of the present technology includes: an annular-shaped tread portion extending in a tire circumferential direction; a pair of sidewall portions disposed on both sides of the tread portion; a pair of bead portions disposed on an inner side in a tire radial direction of the sidewall portions; and a band-like sound absorbing member being adhered on an inner surface of the tread portion in the tire circumferential direction; wherein the band-like sound absorbing member has a plurality of cuts, and both terminals of the cuts terminate at an inner side of the band-like sound absorbing member.

With the present technology, a plurality of cuts are formed on a band-like sound absorbing member, and both terminals of the cuts are configured to terminate at an inner side of the band-like sound absorbing member, and therefore, when a tire deflects during a tire rolling motion, the cuts of the band-like sound absorbing member open and follow deformation of the tire to relieve stress occurring on the band-like sound absorbing member, and thus damaging of the band-like sound absorbing members can be suppressed. Thereby, the durability of the band-like sound absorbing member can be improved. Furthermore, the heat dissipation area of the band-like sound absorbing member increases based on the cuts of the band-like sound absorbing member opening during a tire rolling motion, and therefore, heat dissipation from the band-like sound absorbing member can be promoted, and thus high-speed durability of the pneumatic tire can be improved. Furthermore, both terminals of the cuts terminate at the inner side of the band-like sound absorbing member, and therefore, movement of the band-like sound absorbing member can be limited, and thus damaging of the band-like sound absorbing member or rubbing between the band-like sound absorbing members can be further suppressed.

Furthermore, an angle $\theta$ of the plurality of cuts with regard to the tire circumferential direction is preferably within a range of $40°\leq\theta\leq90°$. Thereby, the cuts of the band-like sound absorbing member can open and follow deformation of the tire during a tire rolling motion, relieve stress generated on the band-like sound absorbing member, and suppress damaging of the band-like sound absorbing member. Furthermore, heat dissipation from the band-like sound absorbing member can be promoted, and high-speed durability of the pneumatic tire can be improved.

A depth d of the cuts is preferably 50% or more with regard to a thickness D of the band-like sound absorbing member. Thereby, the cuts of the band-like sound absorbing member can open during a tire rolling motion, promote heat dissipation from the band-like sound absorbing member, and improve the high-speed durability of the pneumatic tire.

A width a of the cuts of the band-like sound absorbing member is preferably 40% to 90% with regard to a width A of the band-like sound absorbing member. Thereby, the cuts of the band-like sound absorbing member can open during a tire rolling motion to promote heat dissipation from the band-like sound absorbing member.

A volume of the band-like sound absorbing member is preferably 10% to 30% with regard to the luminal volume of the tire. Thereby, a sound absorbing effect based on the band-like sound absorbing member can be even further achieved. An excellent noise reducing effect can be achieved by increasing the volume of the band-like sound absorbing member, and a favorable stress relieving effect and heating dissipating effect can be demonstrated even with a large band-like sound absorbing member. The luminal volume of the tire is a volume of a cavity portion formed between a tire and rim in a condition where the tire is mounted on a regular rim and inflated to a regular internal pressure "Regular rim" is a rim defined by a standard for each tire according to a system of standards that includes standards on which tires are based, and refers to a "standard rim" in the case of Japan Automobile Tyre Manufacturers Association (JATMA), refers to a "design rim" in the case of Tire and Rim Association (TRA), and refers to a "measuring rim" in the case of European Tyre and Rim Technical Organisation (ETRTO). However, when the tire is an original equipment tire, the volume of the space is calculated using a genuine wheel to which the tire is assembled. "Regular internal pressure" is the air pressure defined by standards for each tire according to a system of standards that includes standards on which tires are based, and refers to a "maximum air pressure" in the case of JATMA, refers to the maximum value in the table of "TIRE ROAD LIMITS AT VARIOUS COLD INFLATION PRESSURES" in the case of TRA, and refers to the "INFLATION PRESSURE" in the case of ETRTO. However, the air pressure which is displayed on the vehicle is used in a case where the tire is an original equipment tire.

The band-like sound absorbing member preferably has a missing portion in at least one section in the tire circumferential direction. Thereby, long-term resistance is possible against expansion due tire inflation and shear strain of an adhering surface caused by a ground-contacting rolling motion.

BRIEF DESCRIPTION OF DRAWINGS

FIG. 5A to FIG. 5F are developed views of the modified examples.

DETAILED DESCRIPTION

Figure 1:
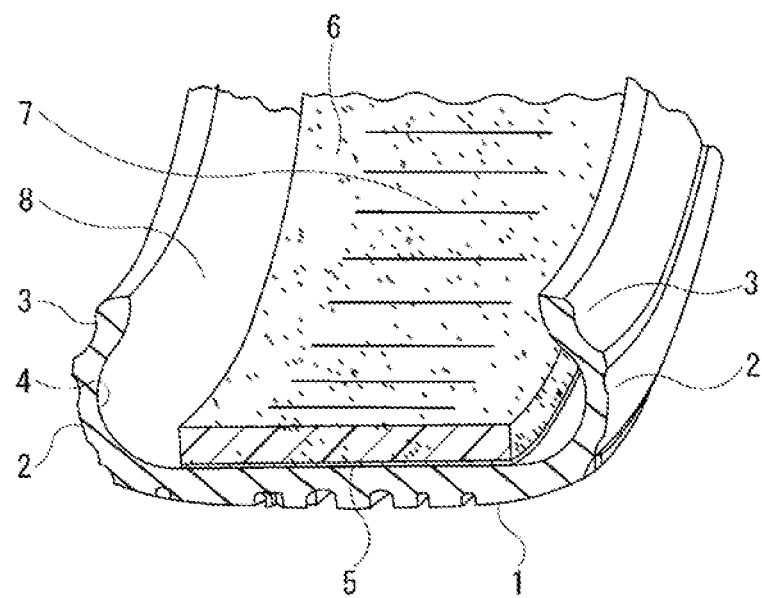
FIG. 1 is a perspective cross-sectional view of a pneumatic tire according to an embodiment of the present technology.
Figure 2:
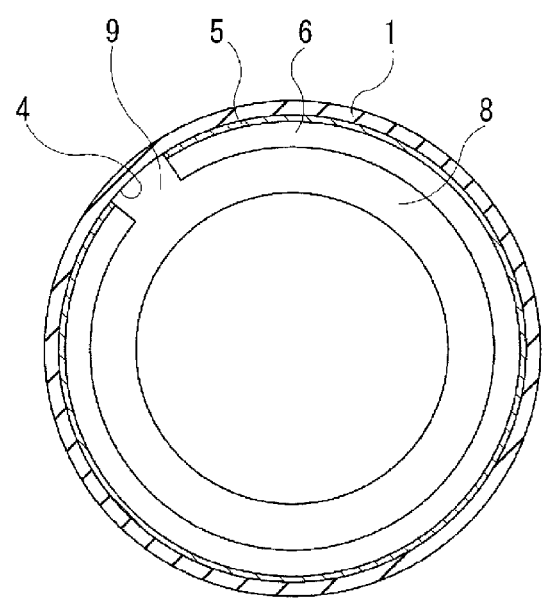
FIG. 2 is a cross-sectional view of an equator line illustrating a pneumatic tire according to an embodiment of the present technology.

A configuration of the present technology will be described in detail below while referring to the attached drawings. FIG. 1 and FIG. 2 illustrate a pneumatic tire according to an embodiment of the present technology. As illustrated in FIG. 1, the pneumatic tire according to the present embodiment includes an annular-shaped tread portion 1 extending in a tire circumferential direction, a pair of sidewall portions 2 disposed on both sides of the tread portion 1, and a pair of bead portions 3 disposed on an inner side in a tire radial direction of the sidewall portions 2.

In the aforementioned pneumatic tire, a band-like sound absorbing member 6 is adhered via an adhesive layer 5 along the tire circumferential direction to a region of a tire inner surface 4 corresponding to the tread portion 1. The band-like sound absorbing member 6 is made of open-cell porous material and has predetermined noise absorbing properties based on the porous structure. Polyurethane foam may be used as the porous material of the band-like sound absorbing member 6. On the other hand, a double-sided adhesive tape is preferable as the adhesive layer 5.

A plurality of cuts 7 extending in a width direction are formed on the band-like sound absorbing member 6. Furthermore, both terminals of the cuts 7 terminate at an inner side of the band-like sound absorbing member 6, and are not connected to both end portions of the band-like sound absorbing member 6 in the width direction.

With the aforementioned pneumatic tire, the plurality of cuts 7 extending in the width direction are formed on the band-like sound absorbing member 6, and both terminals of the cuts 7 are configured to terminate inside the band-like sound absorbing member 6, and therefore, when the tire deflects during a tire rolling motion, the cuts 7 of the band-like sound absorbing member 6 open and follow deformation of the tire to relieve stress occurring on the band-like sound absorbing member 6, and thus damaging of the band-like sound absorbing members 6 can be suppressed. In particular, when a large deflection occurs on the tire, damaging easily occurs at an interface between the band-like sound absorbing member 6 and adhesive layer 5, but the cuts 7 are added to the band-like sound absorbing member 6, and therefore, the damaging can be effectively prevented. Thereby, the durability of the band-like sound absorbing member 6 can be improved. Furthermore, the heat dissipation area of the band-like sound absorbing member 6 increases based on the cuts 7 of the band-like sound absorbing member 6 opening during a tire rolling motion, and therefore, heat dissipation from the band-like sound absorbing member 6 can be promoted, and thus high-speed durability of the pneumatic tire can be improved. Furthermore, both terminals of the cuts 7 terminate at the inner side of the band-like sound absorbing member 6, and therefore, movement of the band-like sound absorbing member 6 can be limited, and thus damaging of the band-like sound absorbing member 6 or rubbing between the band-like sound absorbing members 6 can be further suppressed.

Figure 3:
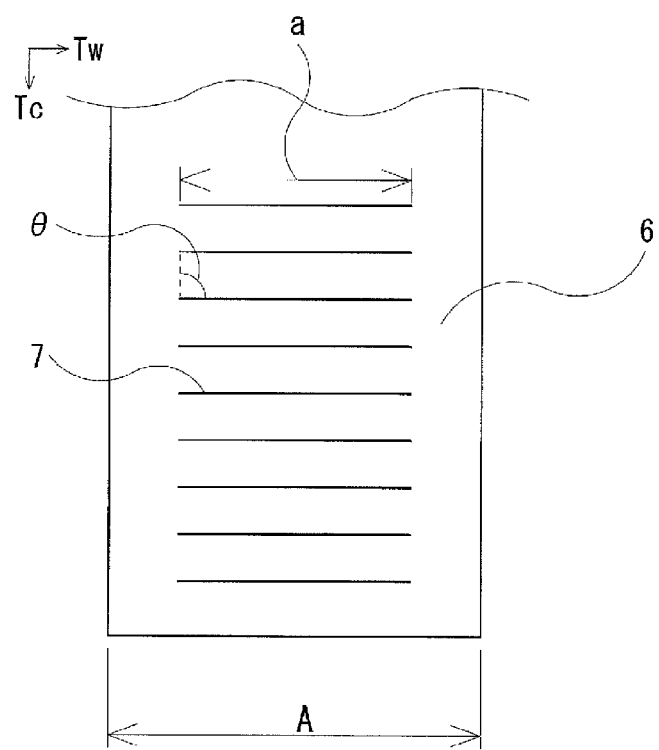
FIG. 3 is a developed view illustrating a portion of a band-like sound absorbing member adhered to an inner surface of a pneumatic tire of the present technology.

As illustrated in FIG. 3, an angle of the cuts 7 with regard to the tire width direction is angle θ. In FIG. 3, Tc represents the tire circumferential direction, and the Tw represents the tire width direction. At this time, angle θ of the cuts 7 with regard to the tire circumferential direction is preferably within a range of $40° \leq \theta \leq 90°$. Thereby, the cuts 7 of the band-like sound absorbing member 6 can open and follow deformation of the tire during a tire rolling motion, relieve stress generated on the band-like sound absorbing member 6, and suppress damaging of the band-like sound absorbing member 6. Furthermore, heat dissipation from the band-like sound absorbing member 6 can be promoted, and high-speed durability of the pneumatic tire can be improved. Herein, when angle θ of the cuts 7 with regard to the tire circumferential direction is too low, the cuts 7 are difficult to open during a tire rolling motion, and therefore, the aforementioned stress relieving effect and heat dissipating effect are reduced.

Furthermore, in FIG. 3, a width of the cuts 7 is set as width a and a width of the band-like sound absorbing member 6 is set as width A. At this time, the width a of the cuts 7 of the band-like sound absorbing member 6 is preferably 40% to 90% with regard to the width A of the band-like sound absorbing member 6. In particular, the width a of the cuts 7 of the band-like sound absorbing member 6 is more preferably 50% to 80% with regard to the width A of the band-like sound absorbing member 6. Thereby, the cuts 7 of the band-like sound absorbing member 6 can open during a tire rolling motion to promote heat dissipation from the band-like sound absorbing member 6. Herein, when the width a of the cuts 7 is too wide, the band-like sound absorbing member 6 is difficult to stabilize, and thus an effect of improving the durability of the band-like sound absorbing member 6 is reduced.

Figure 4:
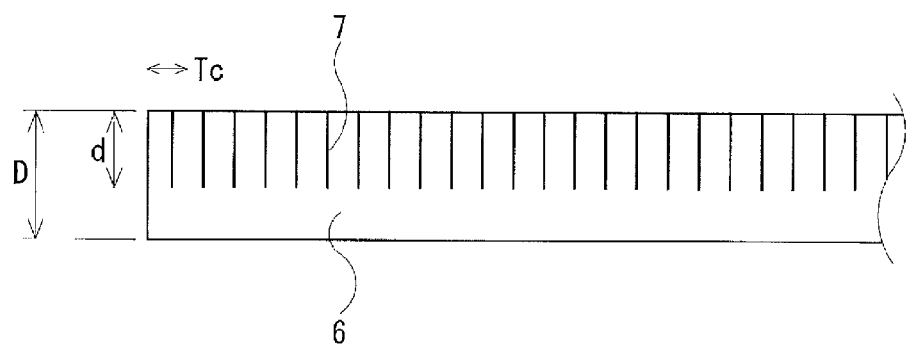
FIG. 4 is a cross-sectional view in a tire circumferential direction of the sound absorbing member in FIG. 3.

FIG. 4 is a cross-sectional view in the tire circumferential direction of the band-like sound absorbing member 6. A depth of the cuts 7 is set as a depth d, and a thickness of the band-like sound absorbing member 6 is set as a thickness D.

At this time, the depth d of the cuts 7 is preferably 50% or more with regard to the thickness D of the band-like sound absorbing member 6. Thereby, the cuts 7 of the band-like sound absorbing member 6 can open during a tire rolling motion to promote heat dissipation from the band-like sound absorbing member 6. Herein, when the depth d of the cuts 7 is too shallow, heat dissipation from the band-like sound absorbing member 6 is reduced, and thus high-speed durability of the tire deteriorates.

In the aforementioned pneumatic tire, a volume of the band-like sound absorbing member 6 is preferably 10% to 30% with regard to the luminal volume of a tire. Furthermore, the width of the band-like sound absorbing member 6 is more preferably 30% to 90% with regard to a tire ground contact width. Thereby, a sound absorbing effect based on the band-like sound absorbing member 6 can be even further achieved. Herein, when the volume of the band-like sound absorbing member 6 is less than 10% with regard to the luminal volume of the tire, a sound absorbing effect cannot be appropriately achieved. Furthermore, when the volume of the band-like sound absorbing member 6 exceeds 30% with regard to the luminal volume of the tire, the noise reducing effect due to the cavernous resonance phenomenon will be constant, and a further reducing effect cannot be expected.

Furthermore, as illustrated in FIG. 2, the band-like sound absorbing member 6 preferably has a missing portion 9 in at least one section in the tire circumferential direction. The missing portion 9 is a portion where the band-like sound absorbing member 6 is not present on a tire circumference. By providing the missing portion 9 on the band-like sound absorbing member 6, long-term resistance is possible against expansion due to tire inflation and shear strain of an adhering surface caused by a ground-containing rolling motion, and shear strain generated on the adhering surface of the band-like sound absorbing member 6 can be effectively relieved. The missing portion 9 is preferably provided at one or 3 to 5 sections on the tire circumference. In other words, when the missing portion 9 is provided on two sections on the tire circumference, tire uniformity significantly deteriorates due to mass unbalance, and when the missing portion 9 is provided on 6 sections or more, manufacturing cost significantly increases.

Note that if the missing portion 9 is provided on two or more sections on the tire circumference, the band-like sound absorbing member 6 is interrupted in the tire circumferential direction. However, even in this case, for example, if a plurality of the band-like sound absorbing members 6 are mutually connected by another laminate such as an adhesive layer 5 formed from a double-side adhesive tape, the band-like sound absorbing members 6 can be handled as an integral member, and therefore, the work of applying to the tire inner surface 4 can be easily performed.

Figure 5A:
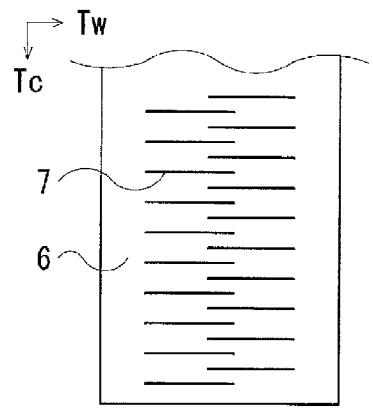
FIGS. 5A to 5F illustrates modified examples of cuts of a band-like sound absorbing member adhered to an inner surface of a pneumatic tire of the present technology, where
Figure 5B:
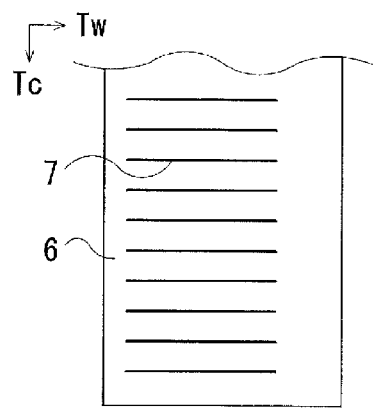
Figure 5C:
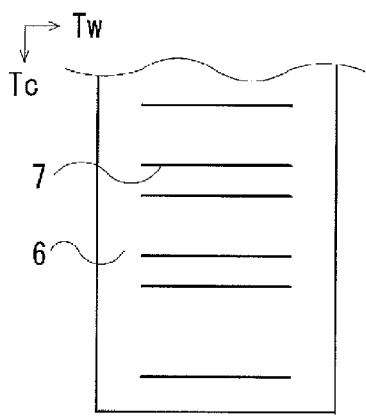
Figure 5D:
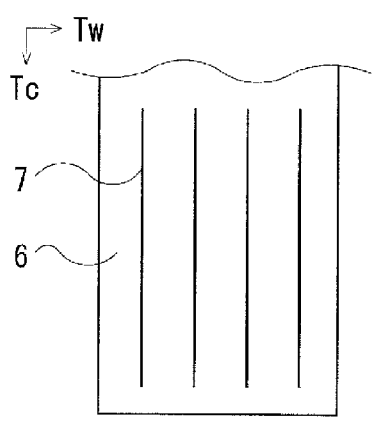
Figure 5E:
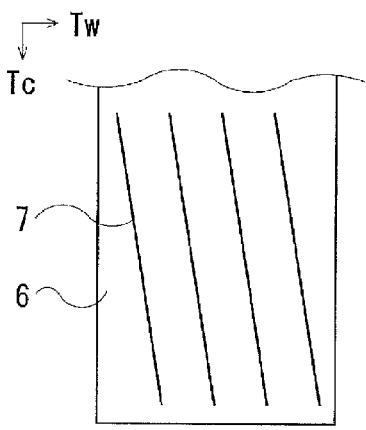
Figure 5F:
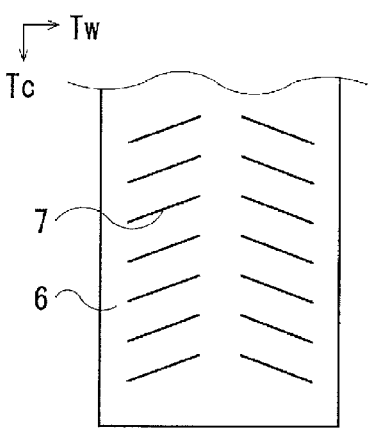

In addition to the case illustrated in FIG. 1, examples of cases for the cuts 7 can include cases where the cuts 7 are disposed in a mutually different manner as illustrated in FIG. 5A, cases where the cuts 7 are disposed more on one side of the band-like sound absorbing member 6 as illustrated in FIG. 5B, and cases where the cuts are randomly disposed as illustrated in FIG. 5C. Furthermore, examples can include cases where the cuts 7 extending in the circumferential direction of the band-like sound absorbing member 6 are disposed as illustrated in FIG. 5D, cases where the cuts 7 inclined at a constant angle in the circumferential direction of the band-like sound absorbing member 6 are disposed as illustrated in FIG. 5E, and cases where the cuts 7 are alternately disposed diagonally as illustrated in FIG. 5F.

The present technology is further described below by examples, but the scope of the present technology is not limited to these examples.

EXAMPLES

Tires of a Conventional Example, Comparative Example 1, and Examples 1 to 11 where the presence of the cuts, placement of the cuts, angle θ of the cuts, depth of the cuts (depth d/thickness D×100%), and width of the cuts (width a/width A×100%) were set as shown in Table 1-1 and Table 1-2, were prepared for a pneumatic tire with a tire size of 275/35ZR20 provided with an annular-shaped tread portion extending in a tire circumferential direction, a pair of sidewall portions disposed on both sides of the tread portion, and a pair of bead portions disposed on an inner side in a tire radial direction of the sidewall portions, where a band-like sound absorbing member is adhered on an inner surface of the tread portion in the tire circumferential direction.

The high-speed durability and the durability of the band-like sound absorbing member during high deflection (rubbing between the band-like sound absorbing members and peeling of an adhering surface) were evaluated for the test tires by the following testing method, and the results thereof are collectively shown in Table 1-1 and Table 1-2.

In Table 1-1 and Table 1-2, the placement of the cuts was "connected" if the cuts formed on the band-like sound absorbing member connected to both end portions in the width direction of the band-like sound absorbing member, and "not connected" if the cuts did not connect to both end portions in the width direction of the band-like sound absorbing member.

High-Speed Durability:

The test tires were assembled on wheels having a rim size of 20×9 1/2J, and then subjected to a traveling test on a drum testing machine under testing conditions where the air pressure was 360 kPa and the load was 5 kN. Specifically, an initial speed was 250 km/h, the speed was increased by 10 km/h every 20 minutes, and the tire was run until failure occurred, and the reached step (speed) was measured. The results are shown in Table 1-1 and Table 1-2.

Durability of Band-Like Sound Absorbing Member During High Deflection (Rubbing Between Band-Like Sound Absorbing Members):

Durability as referred to herein primarily indicates a rating for rubbing between the band-like sound absorbing members and damaging of cut positions. The test tires were assembled on wheels having a rim size of 20×9 1/2J, and subjected to a traveling test on a drum testing machine under testing conditions where the traveling speed was 80 km/h, the air pressure was 160 kPa, the load was 8.5 kN, and the traveling distance was 6,000 km, and then rubbing between the band-like sound absorbing members or presence/absence of damage on the band-like sound absorbing member was visually observed. The results are shown in Table 1-1 and Table 1-2. For the aforementioned items, cases where rubbing between the band-like sound absorbing members or damaging of the band-like sound absorbing member were denoted with "Excellent"; cases where rubbing between the band-like sound absorbing members or damaging of the band-like sound absorbing member occurred in a portion but was not a problem were denoted with "Good"; cases where rubbing between the band-like sound absorbing members or damaging of the band-like sound absorbing member occurred on ¼ or less of the entire band-like sound absorbing member were denoted with "Fair"; and cases where rubbing between the band-like sound absorbing members or damaging of the band-like sound absorbing member occurred on ¼ or more of the entire band-like sound absorbing member were denoted with "Poor".

Durability of Band-Like Sound Absorbing Member During High Deflection (Peeling of Adhering Surface):

Durability as referred to herein primarily indicates a rating for peeling of the adhering surface or damaging between the band-like sound absorbing member and adhesive layer. The test tires were assembled on wheels having a rim size of 20×9 1/2J, and subjected traveling test on a drum testing machine under testing conditions where the traveling speed was 80 km/h, the air pressure was 160 kPa, the load was 8.5 kN, and the traveling distance was 6,000 km, and then peeling of the adhering surface on the band-like sound absorbing member or presence/absence of damage on the band-like sound absorbing member was visually observed. The results are shown in Table 1-1 and Table 1-2. For the aforementioned items, cases where no dropout or damage occurred were denoted with "Excellent"; cases where peeling of the adhering surface or damaging of the band-like sound absorbing member occurred in a portion but was not problem were denoted with "Good"; cases where peeling of the adhering surface or damaging of the band-like sound absorbing member occurred on ¼ or less of the entire band-like sound absorbing member were denoted with "Fair"; and cases where peeling of the adhering surface or damaging of the band-like sound absorbing member occurred on ¼ or more of the entire band-like sound absorbing member were denoted with "Poor".

TABLE 1-1

|  | Conventional example | Comparative Example 1 | Example 1 | Example 2 | Example 3 | Example 4 | Example 5 |
|---|---|---|---|---|---|---|---|
| Presence/absence of cuts | Absence | Presence | Presence | Presence | Presence | Presence | Presence |
| Placement of cuts | — | Connected | Not connected | Not connected | Not connected | Not connected | Not connected |
| Angle θ of cuts | — | 35° | 35° | 40° | 65° | 90° | 90° |
| Depth of cut (Depth d/thickness D × 100%) | — | 45% | 45% | 45% | 45% | 45% | 50% |
| Width of cuts (width a/width A × 100%) | — | 35% | 35% | 35% | 35% | 35% | 35% |
| High-speed durability | 310 km/h | 320 km/h | 320 km/h | 320 km/h | 320 km/h | 320 km/h | 330 km/h |
| Durability of band-like sound absorbing member during high deflection (Rubbing between band-like sound absorbing members) | — | Fair | Excellent | Excellent | Excellent | Excellent | Excellent |
| Durability of band-like sound absorbing member during high deflection (Peeling of adhering surface | Poor | Good | Good | Excellent | Excellent | Excellent | Excellent |

TABLE 1-2

|  | Example 6 | Example 7 | Example 8 | Example 9 | Example 10 | Example 11 |
|---|---|---|---|---|---|---|
| Presence/absence of cuts | Presence | Presence | Presence | Presence | Presence | Presence |
| Placement of cuts | Not connected | Not connected | Not connected | Not connected | Not connected | Not connected |
| Angle θ of cuts | 90° | 90° | 90° | 90° | 90° | 90° |
| Depth of cut (Depth d/thickness D × 100%) | 75% | 100% | 75% | 75% | 75% | 75% |
| Width of cuts (width a/width A × 100%) | 35% | 35% | 40% | 65% | 90% | 95% |
| High-speed durability | 330 km/h | 340 km/h | 340 km/h | 340 km/h | 340 km/h | 340 km/h |
| Durability of band-like sound absorbing member during high deflection (Rubbing between band-like sound absorbing members) | Excellent | Excellent | Excellent | Excellent | Excellent | Good |
| Durability of band-like sound absorbing member during high deflection (Peeling of adhering surface | Excellent | Excellent | Excellent | Excellent | Excellent | Excellent |

As seen in Table 1-1 and Table 1-2, the high-speed durability and the durability of the band-like sound absorbing member during high deflection (rubbing between the band-like sound absorbing members and peeling of the adhering surface) of the pneumatic tires of Examples 1 to 11 simultaneously improved.

On the other hand, in Comparative Example 1, the cuts were formed connected to both end portions in the width direction of the band-like sound absorbing member, and therefore, the durability of the band-like sound absorbing member during high deflection (rubbing between the band-like sound absorbing members) deteriorated.

The invention claimed is:

1. A pneumatic tire, comprising:
   an annular-shaped tread portion extending in a tire circumferential direction;
   a pair of sidewall portions disposed on both sides of the tread portion;
   a pair of bead portions disposed on an inner side in a tire radial direction of the sidewall portions; and
   a band shaped sound absorbing member being adhered on an inner surface of the tread portion in the tire circumferential direction; wherein
   the band shaped sound absorbing member has a plurality of cuts, both terminals of the cuts terminate at an inner side of the band shaped sound absorbing member such that neither of the terminals are connected to an end portion of the sound absorbing member in a width direction of the sound absorbing member, and
   the plurality of cuts have a closed state which transitions to an open state when the pneumatic tire deflects during a rolling motion.

2. The pneumatic tire according to claim 1, wherein a depth d of the cuts is 50% or more with regard to a thickness D of the band shaped sound absorbing member.

3. The pneumatic tire according to claim 1, wherein a volume of the band shaped sound absorbing member is 10% to 30% with regard to a luminal volume of the tire.

4. The pneumatic tire according to claim 1, wherein the band shaped sound absorbing member has a missing portion in at least one section in the tire circumferential direction.

5. The pneumatic tire according to claim 1, wherein a width a of the cuts is 40% to 90% with regard to a width A of the band-like sound absorbing member.

6. A pneumatic tire according to claim 1, wherein an angle θ of the cuts with regard to the tire circumferential direction is within a range of $40° \leq \theta \leq 69°$.

7. The pneumatic tire according to claim 1, wherein a depth d of the cuts is 51% or more with regard to a thickness D of the band shaped sound absorbing member.

8. A pneumatic tire according to claim 1, wherein an angle θ of the cuts with regard to the tire circumferential direction is within a range of $40° \leq \theta \leq 90°$.

9. The pneumatic tire according to claim 8, wherein a depth d of the cuts is 50% or more with regard to a thickness D of the band shaped sound absorbing member.

10. The pneumatic tire according to claim 9, wherein a width a of the cuts is 40% to 90% with regard to a width A of the band-like sound absorbing member.

11. The pneumatic tire according to claim 10, wherein a volume of the band shaped sound absorbing member is 10% to 30% with regard to a luminal volume of the tire.

12. The pneumatic tire according to claim 11, wherein the band shaped sound absorbing member has a missing portion in at least one section in the tire circumferential direction.

* * * * *